United States Patent

[11] 3,621,009

[72] Inventors Nobujiro Ono
Tokyo;
Hiroshi Hattori, Yokohama; Shoji Tada,
Kasukabe-shi; Tsunetoshi Kaida, Tokyo, all
of Japan
[21] Appl. No. 726,525
[22] Filed May 3, 1968
[45] Patented Nov. 16, 1971
[73] Assignee Nippon Kayaku Kabushiki Kaisha
Tokyo, Japan
[32] Priorities May 10, 1967
[33] Japan
[31] 42/29113;
May 26, 1967, Japan, No. 42/33110; May
26, 1967, Japan, No. 42/33111

[54] MIXTURES OF PHENYL-AZO-PHENYL
DYESTUFFS
3 Claims, No Drawings
[52] U.S. Cl...................................................... 260/207,
8/26, 8/41 C, 260/562 K
[51] Int. Cl...................................................... C07c
107/06, C09b 29/26
[50] Field of Search........................................... 260/207,
207.1

[56] References Cited
UNITED STATES PATENTS
2,323,314  7/1943  Dickey et al.................  260/207.1 X
3,478,011  11/1969  Artz.............................  260/207.1 X

*Primary Examiner*—Charles B. Parker
*Assistant Examiner*—Charles F. Warren
*Attorney*—Birch, Swindler, McKie & Beckett ABSTRACT: A mixture of dyestuffs of the general formulas (I) and (II),

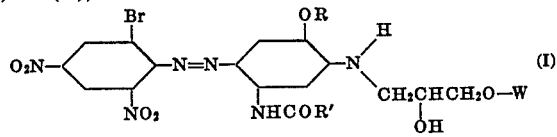

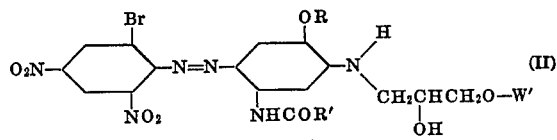

wherein R and R' are lower alkyl groups, W is a lower alkyl group and W' is a phenol group is disclosed. The respective components of the mixture are contained in an amount of more than 20 percent by weight. The mixture of dyestuffs has a particularly superior dyeing affinity to a polyester fiber.

MIXTURES OF PHENYL-AZO-PHENYL DYESTUFFS

The present invention relates to a monoazo dyestuff and to a process for producing the same. The present invention also relates to a mixture of the monoazo dyestuff produced in accordance with the process of the present invention.

The monoazo dyestuff of the present invention is represented by the general formula (I)

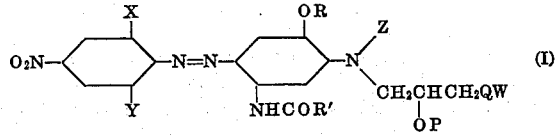

wherein X is a halogen, Y is a nitro or cyano group, R and R' are lower alkyl groups, Z is a hydrogen or a lower alkyl group capable of having a substituent, P is a hydrogen or a lower acyl group, Q is an oxygen or a sulfur and W is an alkyl, aralkyl or aryl group.

It has been well known in the art that previous dyestuffs have disadvantages in the point of dyeing affinity a hydrophobic fiber, in particular to a polyester fiber, as well as in the point of light and heat resistances of dyeings therewith. And prominently the previous dyestuffs belonging to this monoazo system are liable to be affected in the dyeing affinity thereof with a pH of dye bath at the time of dyeing, that is to say, the dyeing affinities thereof are fluctuated largely depending on variations of the pH of the same. Accordingly, in order to obtain a desirable dyeing density, it has been requested to carry out a strict regulation of the pH of dye bath.

One of the objects of the present invention is to provide a monoazo dyestuff which has an excellent dyeing affinity to a hydrophobic fiber, in particular to a polyester fiber, together with superior light and heat resistances of dyeing therewith.

Another object of the present invention is to provide a mixture of monoazo dyestuffs produced in accordance with the process of the present invention, which has a particularly excellent dyeing affinity to a polyester fiber.

A further object of the present invention is to provide a composition of monoazo dyestuffs produced by the use of a mixture of coupling components of two kinds or more in accordance with the process of the present invention, which has an especially superior dyeing affinity to a polyester fiber.

A furthermore object of the present invention is to provide a process for producing the monoazo dyestuff by diazotizing an amine of the general formula (II)

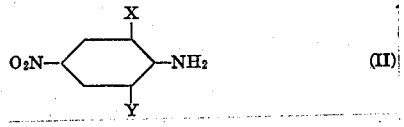

and coupling the resultant diazotized solution to an amine of the general formula (III)

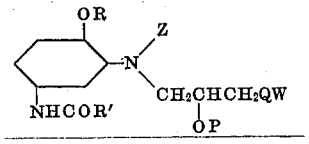

wherein X, Y, R, R', Z, W, P and Q have the foregoing significances.

A still further object of the present invention is to provide a process for producing the monoazo dyestuff by acylating a dyestuff of the general formula (IV)

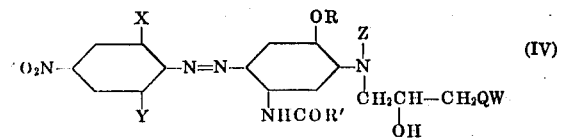

wherein X, Y, R, R', Z, W and Q have the aforedescribed significances.

These and other objects and advantages of the present invention will become apparent to those skilled in the art from a consideration of the undermentioned specification and claims.

In accordance with the present invention, it has been found that the present monoazo dyestuff has an excellent dyeing affinity to a hydrophobic fiber, in particular to a polyester fiber and the dyeing therewith shows a remarkable fastness in respects to a light resistance and a heat resistance, and further present dyestuff is scarcely affected in the dyeing affinity thereof with variations of a pH of dye bath in the course of dyeing operation, which leads to advantages of being used easily for practical applications. In addition, it has also been found that, mixing two kinds or more of the present dyestuffs at an optional ratio or producing a dyestuff composition by the use of a mixture of two kinds or more of coupling components at an optional percentage in the course of coupling, there is obtained a dyestuff having a particularly superior dyeing affinity to the polyester fiber. Each components are preferably contained in an amount of more than 20 percent.

The present dyestuff is produced by diazotizing an amine of the general formula (II) mentioned below and then coupling the resultant diazotized solution to a coupling component of the general formula (III) described hereunder, or, if desired, by treating a dyestuff of the general formula (IV) mentioned hereinafter with an acylation agent, in case where P is a hydrogen:

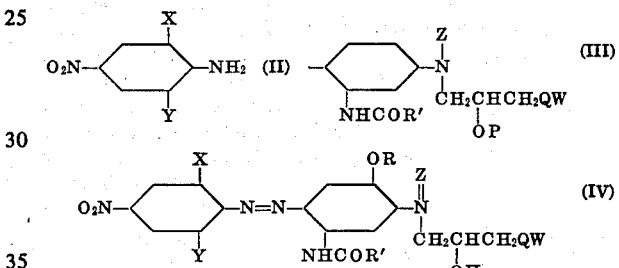

wherein X, Y, R, R', Z, W, P and Q have the aforesaid significances.

The amine represented by the general formula (II) used for the production of the dyestuff of the present invention includes; 2-bromo-4,6-dinitroaniline, 2-chloro-4,6-dinitroaniline, 2-bromo-4-nitro-6-cyanoaniline, 2-chloro-4-nitro-6-cyanoaniline and the like.

Further, the coupling component represented by the general formula (III) includes; 3-acetylamino-6-methoxy-N-(Γ-phenoxy-β-hydroxy-propyl)-aniline, 3-propyonylamino-6-methoxy-N-(Γ-butoxy-β-hydroxy-propyl)-aniline, 3-acetylamino-6-methoxy-N-(Γ-phenoxy-β-acetoxy-propyl)-aniline, 3-acetylamino-6-ethoxy-N-(cyanoethyl)-N-(Γ-phenoxy-β-hydroxy-propyl)-aniline, 3-propyonylamino-6-methoxy-N-ethyl-N-[Γ-(β-hydroxyethylthio)-β-hydroxy-propyl]-aniline, 3-acetylamino-6-methoxy-N-(Γ-benzylthio-β-hydroxy-propyl)-aniline and the like. These components are synthesized by condensating 4-acylamino-2-amino-anisole, 4-acylamino-2-ethylamino-anisole, 4-acylamino-2-amino-phenetole, 4-acylamino-2-cyanoethylamino-phenetole or the like with an epichlorohydrin and then reacting the resultant condensate with sodium alcoholate, sodium-alkyl mercaptide, phenol, and thiophenols, or by condensating the same with alkylglycidylether, arylglycidylether and alkyl-glycidyl thioether. In addition, if desired, these coupling components can be further acylated in a freed hydroxyl group thereof by treating with an acylation agent such as acetyl chloride, propyonyl chloride and the like.

The amine represented by the general formula (II) is easily diazotized in an ordinary manner by effecting in a conc. sulfuric acid with a nitrosyl sulfate at a temperature ranging from 10° to 60° C. Adding this diazotized solution to an acid solution of the aforedescribed coupling component represented by the general formula (III) at a temperature in the range of from 0° to 5° C., there is easily carried out a coupling. In the coupling, if required, it is preferable to accelerate the coupling by the addition of a sodium acetate, sodium carbonate or the like to regulate a pH of the coupling solution. After the coupling, filtering out and washing with water the separated-out product, there is easily obtained the objective dyestuff represented by the general formula (I). In the case where P is a hydrogen in the general formula (III), dissolving the dried dyestuff in an inactive organic solvent such as acetone, dioxane and the like and reacting the resultant solution with an acetylation agent such as acetyl chloride, acetic anhydride, propyonyl chloride and the like at a temperature in the range of from 5° to 65° C. in the presence of a neutralization agent for acid such as pyridine, anhydrous sodium acetate and the like, there is easily carried out an acylation of a freed hydroxyl group therein.

In the course of dyeing a polyester fiber material by the use of the dyestuff in accordance with the present invention, it is of advantage to employ the finely powdered dyestuff in a form of being dispersed in the dye bath. Accordingly, it is preferable to be employed in a form of dispersoid which is prepared by being ground for a long time together with a dispersing agent and wetting agent such as waste solution of cellulose sulfite, condensate of alkylnaphthalene sulfate and formaldehyde and the like. The dyeing is carried out at a temperature ranging from 95° to 105° C. in the presence of a carrier, while at 120° to 140° C. in the absence of the carrier. In case of textile printings, the dyeing is so performed as that a printed fabric material is treated with a dry heating at a comparatively higher temperature, for instance at about 200° C., within a short time or is steamed under the increased pressure. As a carrier in this method, o-phenylphenol, salicylate ester, chlorobenzene, methylnaphthalene and the like can be employed. In order to improve a rubbing resistance, it is preferable to effect an after-treatment reductively over a dyed material or a printed material in a bath containing, for instance, sodium dithionate, sodium hydroxide and detergent. The polyester fiber thus dyed or printed is uniform in dyeing and has a favorable light resistance and a prominent heat resistance.

The following examples are given merely as illustrative of the present invention and are not to be considered as limiting. Unless otherwise specified, the parts therein are by weight.

EXAMPLE 1

1.5 parts of sodium nitrite are charged to 37 parts of conc. sulfuric acid at a temperature of 10° C. or lower and dissolved therein by increasing the temperature gradually and heating with stirring at 60°±2° C. for 15 minutes. 5.3 parts (0.02 mole) of 2,4-dinitro-6-bromo-aniline are charged thereto at room temperature and dissolved. By increasing the temperature to 50° C. and stirring at said temperature for 2 hours, a diazotization of the resultant solution is completed.

On the other hand, to a mixed solution of 10 parts of acetic acid, 30 parts of methanol, 40 parts of water and 10 parts of conc. hydrochloric acid containing 6.6 parts (0.02 mole) of 4-acetylamino-2-(Γ-phenoxy-β-hydroxy-propylamino)-aniline is added 30 parts of ice and maintained at 5° C. or lower. To this mixed solution is added dropwise with stirring at 0° to 5° C. in the course of 1 hour the foregoing diazotized solution. After stirring at said temperature for a further 1 hour, 30 parts of iced water are added thereto and a coupling is accomplished at 5° to 7° C. for an additional 1 hour with stirring. Filtering out and washing with water the separated-out product, there are obtained 10.5 parts of dyestuff having the undermentioned structural formula;

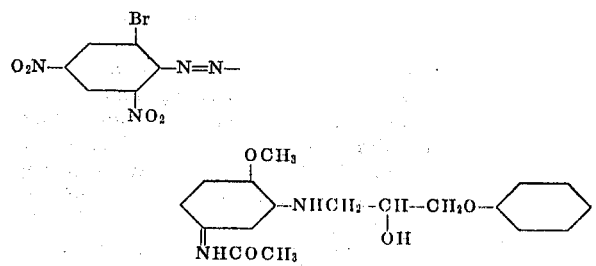

By the use of this dyestuff, there is obtained a polyester fiber dyed to fast navy blue.

The foregoing coupling component is prepared as follows. That is to say, by heating with stirring for 4 hours under the refluent condition 3.6 parts (0.02 mole) of 4-acetylamino-2-amino-anisole, 3.3 parts (0.022 mole) of phenylglycidyl ether and 10 parts of methanol, a condensation is completed to produce 0.02 mole of 4-acetylamino-(Γ-phenoxy-β-hydroxypropylamino)-anisole. To the product is added and dissolved at a temperature of 15° C. or lower a mixed solution of 10 parts of conc. hydrochloric acid, 10 parts of acetic acid, 20 parts of methanol and 40 parts of water to prepare the aforestated coupling solution.

EXAMPLE 2

As described in example 1, a diazotized solution is produced by the use of 5.3 parts (0.02 mole) of 2,4-dinitro-6-bromo-anisole. On the other hand, to a mixed solution of 20 parts of methanol, 50 parts of water and 10 parts of conc. hydrochloric acid containing 5.3 parts (0.02 mole) of 4-acetylamino-2-(Γ-methoxy-β-hydroxypropylamino)-anisole is added 50 parts of ice and maintained at 5° C. or lower. To this mixed solution is added dropwise with stirring at a temperature of 0° to 5° C. in the course of 1 hour the foregoing diazotized solution. Stirring is continued at said temperature for a further 1 hour, then 300 parts of iced water are added, 10 percent solution of soda ash is added further until a pH becomes to 4 to 5, and stirring is still continued at 5° to 10° C. for an additional 1 hour to accomplish a coupling. Filtering out and washing with water the separated-out product, there are obtained 6.8 parts of dyestuff having the undermentioned structural formula;

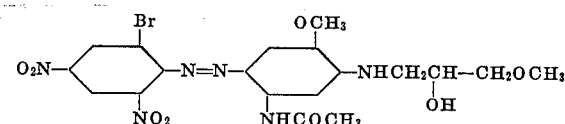

By the use of this dyestuff, there is obtained a polyester fiber dyed to fast navy blue.

The above-mentioned coupler is prepared as follows. That is to say, by heating with stirring for 3 hours under the refluent condition 3.6 parts of 4-acetylamino-2-amino-anisole, 2.0 parts of epichlorohydrin and 15 parts of methanol, 4-acetylamino-2-(Γ-chloro-β-hydroxypropylamino)-anisole is obtained. To this product is added 5.8 parts of 28 percent solution of sodium methylate to react for 4 hours under the refluent condition. A methoxyl substitution is thus completed to produce 5.3 parts of the objective 4-acetylamino-2-(Γ-methoxy-β-hydroxypropylamino)-anisole. To this product is added at 15° C. a mixed solution of 10 parts of hydrochloric acid and 50 parts of water to prepare the coupling solution.

EXAMPLE 3

As described in example 1, a diazotized solution is produced by the use of 5.3 parts of 2,4-dinitro-6-bromo-aniline.

On the other hand, to a mixed solution of 10 parts of acetic acid, 30 parts of methanol, 40 parts of water and 10 parts of hydrochloric acid containing 1.6 parts of 4-acetylamino-2-(β-methoxy-β-hydroxypropylamino)-anisole and 4.6 parts of 4-acetylamino-2-(Γ-phenoxy-B-hydroxypropylamino)-anisole is added 30 parts of ice and maintained at 5° C. or lower. To this mixed solution is added dropwise with stirring at a temperature of 0° to 5° C. in the course of 1 hour the above-mentioned diazotized solution. Stirring is continued at said temperature for a further 1 hour, then 300 parts of iced water are added and stirring is still continued at 5° to 7° C. for an additional 1 hour to complete a coupling. Filtering out and washing with water the separated-out product, there are obtained 10.2 parts of composition of dyestuffs containing substantially the dyestuffs mentioned in examples 1 and 2 in the ratio of 7:3.

By the use of this dyestuff, there is obtained a polyester fiber dyed particularly in good condition.

The coupling components are produced by employing the procedure described in example 1 but replacing 3.3 parts of phenyl glycidyl ether with 2.2 parts of phenyl glycidyl ether and 0.6 parts of methyl glycidyl ether.

EXAMPLE 4

As mentioned in example 1, a diazotized solution is prepared by the use of 5.3 parts of 2.4-dinitro-6-bromo-aniline.

On the other hand, to a mixed solution of 20 parts of methanol, 50 parts of water and 10 parts of conc. hydrochloric acid containing 6.3 parts (0.02 mole) of 4-acetylamino-2-[β-(β-hydroxyethylthio)-β-hydroxypropylamino]-anisole is added 50 parts of ice and maintained at 5° C. or lower. To this mixed solution is added dropwise with stirring at a temperature of 0° to 5° C. in the course of 1 hour the foregoing diazotized solution. Stirring is continued at said temperature for a further 1 hour, then 300 parts of iced water are added, 10 percent solution of soda ash is further added until a pH becomes to 4 to 5, and stirring is still continued at 5° to 10° C. for an additional 1 hour to accomplish a coupling. Filtering out and washing with water the separated-out product, there are obtained 7.1 parts of dyestuff having the structural formula mentioned hereinafter;

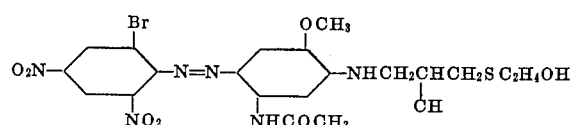

By the use of this dyestuff, there is obtained a polyester dyed to fast navy blue.

The foregoing coupler is prepared as follows. That is to say, by heating with stirring for 3 hours under the refluent condition 3.6 parts of 4-acetylamino-2-amino-anisole, 2.0 parts of epichlorohydrin and 20 parts of methanol, 4-acetylamino-2-(β-chloro-β-hydroxypropylamino)-anisole is prepared. To this product is added 3.0 parts of mercaptoethanol and 2.0 parts of sodium bicarbonate to react for 6 hours under the refluent condition. Thus 6.3 parts of the objective 4-acetylamino-2-[Γ-(β-hydroxyethylthio)-es-hydroxypropylamino[-anisole are quantitively produced. To this product is added at a temperature of 15° C. or lower a mixed solution of 10 parts of hydrochloric acid and 50 parts of water to prepare the coupling solution.

EXAMPLE 5

Employing the procedure of example 4 but replacing 3.0 parts of mercaptoethanol with 3.0 parts of benzylmercaptan, there are obtained 7.3 parts of dyestuff having as a main component the undermentioned structural formula;

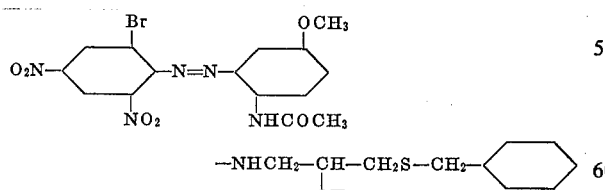

EXAMPLE 6

5.4 parts of the dyestuff powders described in example 2 are added with stirring and dissolved into 50 parts of acetone. 2.5 parts of pyridine are added to the resultant solution, and then 1.7 parts of acetyl chloride are added at 25° to 30° C. in the course of 30 minutes. Stirring is continued for 1 hour at that condition. 4.0 parts of anhydrous sodium acetate are added and further 3.5 parts of acetyl chloride are added dropwise at 20° to 30° C. in the course of 1 hour. Stirrings are carried out at 25° to 30° C. for 1 hour, at 40° to 45° C. for another 1 hour and at 55° to 60° C. for an additional 1 hour to accomplish an acetylation. By pouring the acetylated solution into 300 parts of water, the underdescribed dyestuff is separated out, which is filtered out and washed with water:

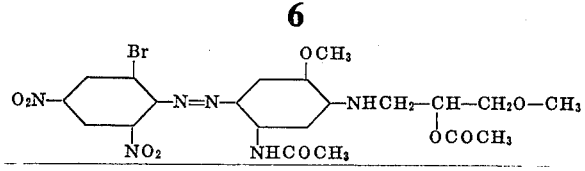

Thus there are obtained 5.5 parts of dyestuff with which a polyester fiber is dyed to reddish navy blue.

EXAMPLE 7

1.5 parts of sodium nitrate are charged to 37 parts of conc. sulfuric acid at 10° C. or lower and dissolved therein by increasing the temperature gradually and heating with stirring at 60°±2 C. for 15 minutes. 5.0 parts (0.02 mole) of 2,4-dinitro-6-chloro-aniline are charged thereto at room temperature and dissolved therein. Increasing the temperature to 50° with stirring for 2 hours, there is completed a diazotization of the resultant solution.

On the other hand, to a mixed solution of 10 parts of acetic acid, 30 parts of methanol, 40 parts of water and 10 parts of conc. hydrochloric acid containing 7.0 parts (0.02 mole) of 4-acetylamino-2-[N-ethyl-N-(Γbutoxy-β-acetyloxypropyl)]-aminophenetole is added 30 parts of ice and maintained at 5° C. or lower. To this mixed solution is added dropwise with stirring at 0° to 5° C. in the course of 1 hour the foregoing diazotized solution. Stirring is continued for a further 1 hour, then 300 parts of iced water are added thereto and the resultant mixed solution is stirred for an additional 1 hour. Filtering out and washing with water the separated-out product, there are obtained 7.5 parts of dyestuff having the undermentioned structural formula:

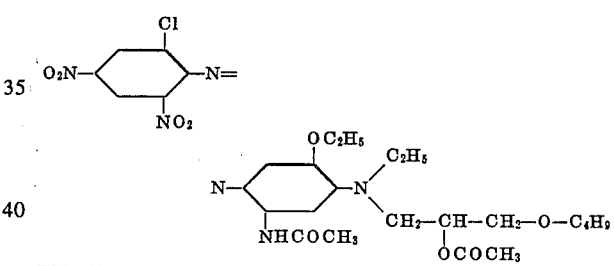

By the use of this dyestuff, there is obtained a polyester fiber dye to navy blue.

The foregoing coupler is synthesized as mentioned below. That is to say, reacting for 3 hours at the refluent condition 4.4 parts of 4-acetylamino-2-ethylamino-phenetole and 2.8 parts of butylglycidyl ether with 20 parts of methanol, there is produced 4-acetylamino-2-[N- ethyl-N-(Γ-butoxy-β-hydroxypropyl)]-aminophenetole. 50 parts of dioxane are added thereto and the methanol is distilled out at 70° to 85° C. Then 3 parts of pyridine are added to the resultant solution and 20 parts of acetyl chloride are added dropwise at 20° to 30° C. Stirring is continued at said temperature for 3 hours to synthesize the coupler having as a main component the objective 4-acetylamino-2-[N-ethyl-N-(Γ-butoxy-β-acetyloxypropyl)]-aminophenetole.

EXAMPLE 8

As described in example 7, a diazotized solution is produced by the use of 5.0 parts of 2,4-dinitro-6-chloro-aniline.

On the other hand, to a mixed solution of 10 parts of acetic acid, 30 parts of methanol, 40 parts of water and 10 parts of hydrochloric acid containing 7.8 parts of 4-acetylamino-2-[N-cyanoethyl-N-(Γ-phenoxy-β-hydroxypropyl)]-amino-anisole is added 30 parts of ice and maintained at 5° C. or lower. To this mixed solution is added dropwise at 0° to 5° C. in the course of about 1 hour the foregoing diazotized solution. Stirring is continued at a temperature of 5°±2° C. for 1 hour, then 300 parts of iced water are added thereto and the resultant solution is further stirred for an additional 1 hour. Filtering out and washing with water the separated-out product, there are obtained 9.3 parts of dyestuff having the underdescribed structural formula:

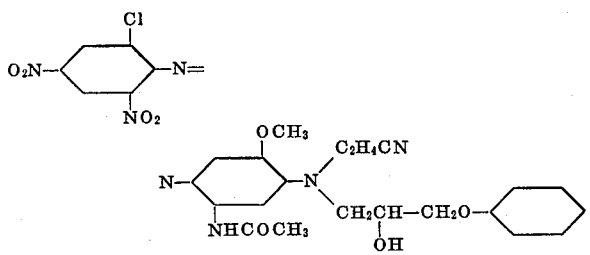

By the use of this dyestuff, there is obtained a polyester fiber dyed to navy blue.

The above-mentioned coupler is synthetized in accordance with the following procedure. That is to say, 3.6 parts of 4-acetylamino-2-amino-anisole, 1.5 parts of acrylonitrile and 10 parts of acetic acid are heated at 80°±2° C. for 5 hours. Then 3.3 parts of phenyl glycidyl ether are added thereto and the resultant solution is heated with stirring at 80°±2° C. for another 5 hours to produce 4-acetylamino-2-[N-cyanoethyl-N-(Γ-phenoxy-β-hydroxypropyl)]-amino-anisole. To said solution is added and dissolved at 15° C. or lower a mixed solution of 10 parts of hydrochloric acid, 30 parts of methanol and 40 parts of water to prepare the coupling solution.

EXAMPLE 9

1.5 parts of sodium nitrate are charged to 37 parts of conc. sulfuric acid at 10° C. or lower and dissolved therein by increasing the temperature gradually and heating with stirring at 60°±2 C. for 15 minutes. 4.8 parts (0.02 mole) of 2-cyano-4-nitro-6-bromo-aniline are charged thereto at room temperature and dissolved therein. Stirring of the resultant solution is effected at 25° to 30° C. for 9 hours to carry out a diazotization.

On the other hand, to a mixed solution of 10 parts of hydrochloric acid, 38 parts of methanol, 40 parts of water and 10 parts of acetic acid containing 5.8 parts of 4-propyonyl amino-2-(Γ-ethoxy-β-hydroxypropylamino)-anisole is added 30 parts of ice and maintained at 5° C. or lower. To said mixed solution is added dropwise at 0° to 5° C. in the course of 1 hour the foregoing diazotized solution. After stirring of the resultant solution is effected at said temperature for another 1 hour, 300 parts of iced water are added thereto and stirring is continued for an additional 1 hour while adding 10 percent solution of sodium acetate until a pH becomes 5. Filtering out, washing with water and drying the separated-out product, there are obtained 8.2 parts of dyestuff having the structural formula mentioned below:

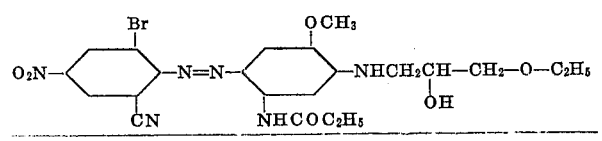

By the use of this dyestuff, there is obtained a polyester fiber dyed to blue.

The coupler is synthesized by employing the procedure of example 2 but replacing 4-acetylamino-2-amino-anisole and sodium methylate with 4-propyonyl-2-amino-anisole and sodium ethylate respectively.

EXAMPLE 10

1.5 parts of sodium nitrate are added to 37 parts of conc. sulfuric acid at 10° C. or lower and dissolved therein by increasing the temperature gradually and heating with stirring at 60°±2 C. for 15 minutes. 3.9 parts of 2-cyano-4-nitro-6-chloro-aniline are added thereto at room temperature and the resultant solution is stirred at 25° to 30° C. for 3 hours, to carry out a diazotization.

On the other hand, to a mixed solution of 10 parts of hydrochloric acid, 20 parts of acetone, 40 parts of water and 10 parts of acetic acid containing 7.5 parts of 4-acetylamino-2-(Γ-phenoxy-β-acetoxy-propylamino)-anisole is added 30 parts of ice and maintained at 5° C. or lower. To the resultant mixed solution is added dropwise with stirring at 0° to 5° C. in the course of about 1 hour the foregoing diazotized solution and stirring is further continued for an additional 1 hour. 300 parts of iced water are added thereto and stirring is still further effected for another 1 hour. Filtering out and washing with water the separated-out product, there are obtained 10.3 parts of dyestuff having the structural formula described hereunder:

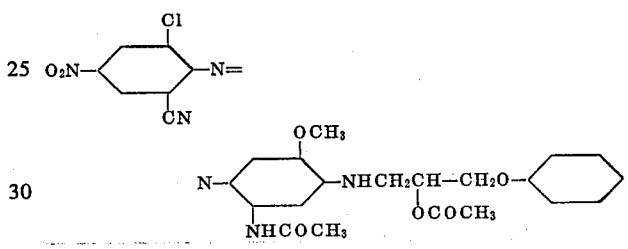

By the use of this dyestuff, there is obtained a polyester fiber dyed to blue.

As mentioned in example 1, the coupler is synthesized by condensing at 60° to 63° C. 4-acetylamino-2-amino-anisole and pheny glycidyl ether in acetone, adding pyridine thereto and then reacting the resultant solution at room temperature with acetyl chloride.

DYEING EXAMPLE 1

Thirty parts of the dyestuff described in example 1 are ground for a long time with 65 parts of condensate comprising alkylnaphthalene sulfonate and formaline as a dispersing agent, 5 parts of sodium polyalkyl naphthalene sulfonate as a wetting agent and some amounts of water, dried and pulverized. Dispersing 5 parts of the resultant dyestuff preparation into 2,000 parts of 1 g./l. solution of soapless soap, there is prepared a dye bath. One-hundred parts of a polyester fiber (Dacron) are impregnated in said dye bath and dyed at 130°±2 C. for 1 hour under the increased pressure. The material is taken out from the dye bath and effected in a bath containing 2 g./l. of sodium dithionate, 3 cc./l. of 34 Be sodium hydroxide and 1 g./l. of nonionic detergent (polyglycol ether) at a temperature of 80° to 90° C. for 15 minutes with a reductive after-treatment. Thus there is obtained a navy blue dyeing having an excellent heat resistance.

In the same manner as described above, employing dyestuffs mentioned in the left column described hereinafter, there are obtained fast dyeings of color phases described in the right column thereof:

| Dyestuff | Colour phase of dyeing |
|---|---|
| O₂N—⟨Br/NO₂⟩—N=N—⟨OCH₃/NHCOCH₃⟩—NHCH₂CH(OH)—CH₂O—⟨⟩ | Navy blue. |
| O₂N—⟨Cl/NO₂⟩—N=N—⟨OC₂H₅/NHCOCH₃⟩—NHCH₂CH(OH)—CH₂O—C₄H₉ | Do. |

| Dyestuff | Colour phase of dyeing |
|---|---|
| (structure with Br, OCH₃, NO₂, NHCOC₂H₅, NHCH₂CH(OH)—CH₂S—CH₂—phenyl) | Do. |
| (structure with Br, OCH₃, NO₂, NHCOCH₃, N(C₂H₄CN)(CH₂CH(OH)CH₂O—C₄H₉)) | Do. |
| (structure with Br, OCH₃, CN, NHCOCH₃, NH—CH₂CH(OH)—CH₂S—C₂H₄—OH) | Blue. |
| (structure with Br, OC₂H₅, CN, NHCOCH₃, N(C₂H₅)(CH₂CH(OCOCH₃)CH₂O—C₂H₅)) | Do. |
| (structure with Cl, OCH₃, CN, NHCOCH₃, NH—CH₂CH(OH)—CH₂S—phenyl) | Do. |

DYEING EXAMPLE 2

Employing the procedure of dyeing example 1 but replacing the dyestuff with 30 parts of the dyestuff described in example 4, there is obtained a dyestuff preparation. Dispersing 5 parts of said dyestuff preparation into 2,000 parts of solution comprising 0.5 g./l. soapless soap and 3 g./l. sodium of ortho-phenylphenol, there is prepared a dye bath. One-hundred parts of a polyester fiber (Dacron) are impregnated in said dye bath at 75° C. Then the dye bath is boiled during the lapse of 30 minutes therefrom. After boiling for 15 minutes, a small amount of 60 g./l. solution of ammonium phosphate is added and further 0.5 part of 10 percent acetic acid added thereto. Thus the material is dyed at the boiling for 90 minutes. The dyed material is taken out from the dye bath and rinsed reductively in the same manner as described in the above dyeing example 1. Thus there is obtained a navy blue dyeing having an excellent heat resistance.

DYEING EXAMPLE 3

Employing the procedure of dyeing example 1 but replacing the dyestuff with 30 parts of the dyestuff described in example 9, there is obtained a dyestuff preparation. Twenty parts of this dyestuff preparation are added to 80 parts of an original printing solution having an undermentioned composition and dispersed sufficiently by means of a high-speed agitator:

COMPOSITION OF ORIGINAL PRINTING SOLUTION

| | |
|---|---|
| Gum Arabic (1:1) | 30 parts |
| Crystal rubber (1:1) | 30 parts |
| Water | 25 parts |
| Cyclohexanone | 4 parts |
| Thiodiglycol | 4 parts |
| 10 % solution of sodium m-nitrobenzene sulfonate | 5 parts |
| Mixture of potassium oleate and pine oil | 2 parts |
| Total : | 100 parts |

A fabric of polyester (Dacron) is printed with this pastelike preparation, semidried and then steamed for 45 minutes under the gauge pressure of 3 to 4 kg./cm². Subsequently, the fabric is rinsed with cold water for 10 minutes, squeezed and dried. Thus there is obtained a fast blue printed fabric.

The invention being thus described, it will be obvious that the same may be varied in many ways. Such variations are not to be regarded as a departure from the spirit and scope of the present invention, and all such modifications are intended to be included within the scope of the following claims.

It is claimed:

1. A mixture of dyestuffs of the general formulas (I) and (II),

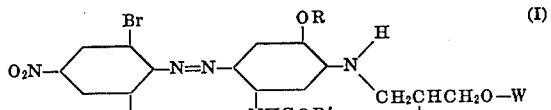

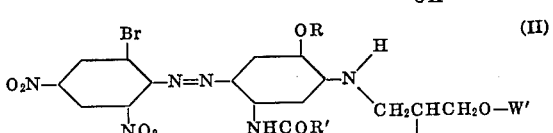

wherein R and R' are lower alkyl groups, W is a lower alkyl group and W' is a phenyl group, the respective components of said mixture being contained in an amount of more than 20 percent by weight.

2. A mixture of dyestuffs of the structural formulas (A) and (B),

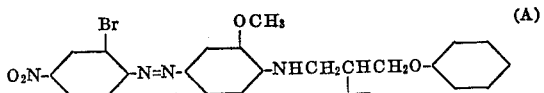

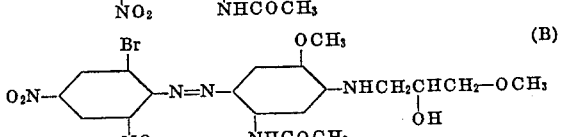

the respective components of said mixture being contained in an amount of more than 20 percent by weight.

3. The mixture of claim 2 wherein the weight ratio of dyestuff (A) to dyestuff (B) is about 7:3.

* * * * *